US010019905B1

(12) United States Patent
Kneuper et al.

(10) Patent No.: US 10,019,905 B1
(45) Date of Patent: Jul. 10, 2018

(54) AIRCRAFT HOLDING PATTERN ANALYSIS SYSTEM AND METHOD

(71) Applicant: THE BOEING COMPANY, Chicago, IL (US)

(72) Inventors: Nils Kneuper, Bergkamen (DE); Garoe Gonzalez Parra, Neu-Isenburg (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/468,194

(22) Filed: Mar. 24, 2017

(51) Int. Cl.

| | |
|---|---|
| ***G06F 19/00*** | (2018.01) |
| ***G06G 7/70*** | (2006.01) |
| ***G06G 7/76*** | (2006.01) |
| ***G08G 5/00*** | (2006.01) |
| ***G06N 7/00*** | (2006.01) |

(52) U.S. Cl.
CPC ........... *G08G 5/0013* (2013.01); *G06N 7/005* (2013.01); *G08G 5/0021* (2013.01); *G08G 5/0039* (2013.01); *G08G 5/0073* (2013.01)

(58) Field of Classification Search
CPC .. G08G 5/0013; G08G 5/0021; G08G 5/0039; G08G 5/0073; G06N 7/005
See application file for complete search history.

(56) References Cited

U.S. PATENT DOCUMENTS

| | | | | |
|---|---|---|---|---|
| 5,398,186 A * | 3/1995 | Nakhla | ................ | G08G 5/0021 244/183 |
| 5,553,387 A * | 9/1996 | Newcomb | ............. | G01C 21/20 235/78 N |
| 6,282,466 B1 * | 8/2001 | Nolte | .................. | G05D 1/0808 244/178 |
| 7,546,206 B1 * | 6/2009 | Miller | .................... | G01C 21/00 701/120 |
| 8,694,184 B1 * | 4/2014 | Boorman | ............... | G01C 23/00 340/945 |
| 2003/0128122 A1 * | 7/2003 | Reynolds | ........... | B64D 45/0015 340/573.1 |
| 2004/0122567 A1 * | 6/2004 | Gaier | ..................... | G01C 23/00 701/4 |
| 2004/0230351 A1 * | 11/2004 | Rumbo | ................ | G05D 1/0202 701/3 |
| 2005/0004745 A1 * | 1/2005 | Rumbo | .................. | G01C 21/20 701/532 |
| 2007/0040011 A1 * | 2/2007 | Martincik | ............. | G01C 21/20 235/61 NV |
| 2007/0129855 A1 * | 6/2007 | Coulmeau | ............ | G08G 5/0039 701/3 |
| 2007/0219831 A1 * | 9/2007 | Ne'meth | ................ | G06Q 40/08 705/4 |
| 2010/0174426 A1 * | 7/2010 | Turung | ................ | G05D 1/0061 701/11 |
| 2012/0130626 A1 * | 5/2012 | Klooster | .............. | G08G 5/0021 701/120 |

(Continued)

*Primary Examiner* — Mussa A Shaawat
(74) *Attorney, Agent, or Firm* — Joseph M. Butscher; The Small Patent Law Group, LLC

(57) ABSTRACT

A holding pattern analysis system and method include a holding pattern detection unit that is configured to detect when an aircraft is flying in a holding pattern proximate to a destination airport, and a holding time prediction unit that is configured to predict a total time of the holding pattern in response to the holding pattern detection unit detecting that the aircraft is flying in the holding pattern.

21 Claims, 4 Drawing Sheets

(56) References Cited

U.S. PATENT DOCUMENTS

| | | | | |
|---|---|---|---|---|
| 2013/0046422 | A1* | 2/2013 | Cabos | G08G 5/0034 701/3 |
| 2013/0345905 | A1* | 12/2013 | Parthasarathy | G01C 23/00 701/3 |
| 2014/0257684 | A1* | 9/2014 | Wilder | G08G 5/0052 701/121 |
| 2015/0279218 | A1* | 10/2015 | Irrgang | G08G 5/0039 701/3 |
| 2016/0031565 | A1* | 2/2016 | Mohan | B64D 37/12 701/3 |
| 2016/0103579 | A1* | 4/2016 | Coulmeau | G08G 5/0021 701/533 |
| 2016/0290817 | A1* | 10/2016 | Hoogland | G01C 21/3492 |
| 2017/0301246 | A1* | 10/2017 | De Prins | G08G 5/0091 |

* cited by examiner

AIRCRAFT HOLDING PATTERN ANALYSIS SYSTEM AND METHOD

FIELD OF THE DISCLOSURE

Embodiments of the present disclosure generally relate to systems and methods for analyzing holding patterns of aircraft.

BACKGROUND OF THE DISCLOSURE

Commercial aircraft are used to transport passengers between various locations. A commercial aircraft generally flies according to a predetermined flight plan between a departure airport and a destination airport. The flight plan includes a path from the departure airport and the destination airport, and may also include a flight time between the locations.

For various reasons, commercial, business, and general aviation aircraft may be diverted from a flight plan. For example, inclement weather may cause an air traffic controller to divert an aircraft from a flight plan. Due to inclement weather (such as rain or snow), visibility at a destination airport may be limited. Accordingly, an air traffic controller may then determine that separation times between landing aircraft need to be increased. As another example, flight congestion at a destination airport may also cause the air traffic controller to divert an aircraft from a flight plan into a holding pattern.

In order to accommodate landing delays at a particular destination airport (whether due to inclement weather, flight congestion, or the like), an aircraft is often diverted into a holding pattern, which deviates from the flight plan. Typically, an air traffic controller verbally communicates with a pilot onboard an aircraft to inform a pilot of a required landing delay, and directs the pilot to fly the aircraft in a holding pattern until further notice. Once the aircraft is diverted into the holding pattern, the pilot is typically unaware as to how long the holding pattern will last. As such, the pilot may periodically contact the air traffic controller to inquire as to when the aircraft will be cleared for landing.

As can be appreciated, the sooner a pilot is able to determine a total expected time of a holding pattern, the sooner the pilot will know when the aircraft will eventually land. Further, a pilot may decide to divert the aircraft to another airport if the holding pattern will be too long, such as if the aircraft is running low on fuel. Again, the sooner the pilot is aware of the expected duration of the holding pattern, the sooner the pilot will be able to decide the most appropriate action to take (for example, a decision as to whether to remain in a holding pattern, or divert the aircraft to another airport).

Additionally, because the pilot of the aircraft may periodically contact the air traffic controller regarding eventual clearance for landing, the air traffic controller may be distracted from other duties and responsibilities. Consequently, the flight schedules of various flights may be delayed due to the air traffic controller communicating with one or more pilots regarding holding patterns.

Moreover, passengers onboard an aircraft may become anxious and/or irritated when the aircraft is in a holding pattern. In particular, certain passengers may become anxious on account of not knowing exactly when the aircraft will land.

SUMMARY OF THE DISCLOSURE

A need exists for a system and method for determining an expected duration of a holding pattern. A need exists for a system and method for updating a pilot of an aircraft regarding a holding pattern without the need for communicating with an air traffic controller. A need exists for a system and method for informing pilots and passengers onboard an aircraft as to the expected duration of a holding pattern.

With those needs in mind, certain embodiments of the present disclosure provide a holding pattern analysis system that includes a holding pattern detection unit that is configured to detect when an aircraft is flying in a holding pattern proximate to a destination airport, and a holding time prediction unit that is configured to predict a total time of the holding pattern in response to the holding pattern detection unit detecting that the aircraft is flying in the holding pattern. In at least one embodiment, the holding time prediction unit is configured to communicate the total time of the holding pattern to one or both of a pilot of the aircraft or an air traffic controller.

In at least one embodiment, the holding pattern analysis system includes a tracking sub-system in communication with the holding pattern detection unit. The tracking sub-system is configured to track a current position of the aircraft. The holding pattern detection unit is configured to detect when the aircraft is flying in the holding pattern based on the current position of the aircraft. The tracking sub-system may be an automatic dependent surveillance-broadcast (ADS-B) tracking sub-system.

The holding pattern analysis system may also include a flight plan database coupled to the holding pattern detection unit. The flight plan database stores flight plan data regarding a flight plan of the aircraft. The holding pattern detection unit is configured to detect when the aircraft is flying in the holding pattern based on a deviation of the aircraft from the flight plan.

In at least one embodiment, the holding time prediction unit is configured to predict the total time of the holding pattern based, at least in part, on a number of other aircraft scheduled to land at the destination airport before the aircraft, a number of other aircraft flying in at least one other holding pattern proximate to the destination airport, and historical data of holding patterns of previous aircraft that landed at the destination airport. The historical data of holding patterns of other aircraft may be based on one or more of a current day of flights, at least one week of flights, or at least one year of flights.

The holding pattern analysis system may also include a historic holding pattern database coupled to the holding time prediction unit. The historic holding pattern database stores the historical data of holding patterns of the other aircraft.

In at least one embodiment, the holding time prediction unit is configured to output a holding time prediction signal to the aircraft. The holding time prediction signal includes a holding time prediction regarding the total time of the holding pattern. The holding time prediction may be displayed on one or both of a display of a flight computer or a passenger display.

Certain embodiments of the present disclosure provide a holding pattern analysis method that includes detecting, using a holding pattern detection unit, when an aircraft is flying in a holding pattern proximate to a destination airport, and predicting, using a holding time prediction unit, a total time of the holding pattern in response to the holding pattern detection unit detecting that the aircraft is flying in the holding pattern. The method may also include communicating the total time of the holding pattern to one or both of a pilot of the aircraft or an air traffic controller.

In at least one embodiment, the holding pattern analysis method includes coupling a tracking sub-system to the holding pattern detection unit, and tracking, using the tracking sub-system, a current position of the aircraft. The detecting may be based on the current position of the aircraft.

In at least one embodiment, the holding pattern analysis method includes coupling a flight plan database to the holding pattern detection unit, and storing flight plan data regarding a flight plan of the aircraft in the flight plan database. The detecting may be based on a deviation of the aircraft from the flight plan.

Certain embodiments of the present disclosure provide a holding pattern analysis system that includes a holding time prediction unit that is configured to predict a total time of a holding pattern an aircraft. The holding time prediction unit is configured to communicate the total time of the holding pattern to one or both of a pilot of the aircraft or an air traffic controller.

DETAILED DESCRIPTION OF THE DISCLOSURE

Figure 1:
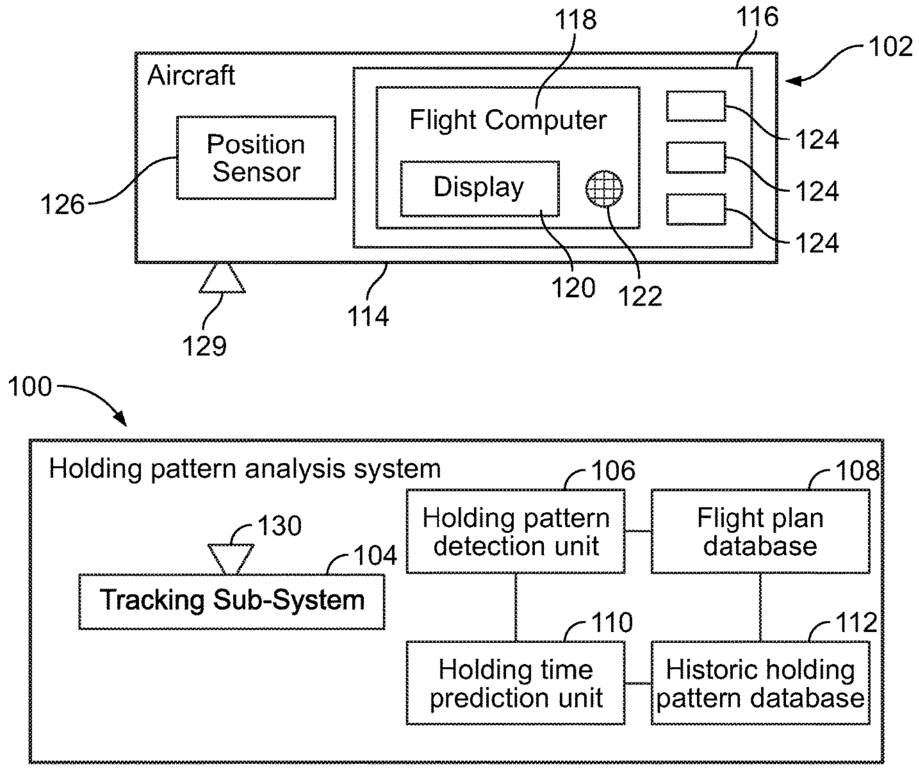
FIG. 1 is a schematic representation of a holding pattern analysis system in communication with an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a holding pattern analysis system that determines if and when an aircraft is flying in a holding pattern. The holding pattern analysis system is configured to determine when an aircraft is in a holding pattern, and predict a duration of the holding pattern. The holding pattern analysis system allows for a quick and efficient assessment of a holding pattern, thereby allowing a pilot to make an informed landing decision (such as to remain in the holding pattern until a predicted time of landing at a destination airport, or to divert the aircraft to another airport). The holding pattern analysis system communicates with an aircraft to inform and update a pilot of a holding pattern duration without the need for the pilot to communicate with an air traffic controller.

Embodiments of the present disclosure provide holding pattern analysis systems and methods that increase situational awareness of aircraft operators, pilots, and/or passengers. For example, the holding patterns analysis systems and methods allow for real time updates of an arrival time for an aircraft, such as may be displayed on a flight computer within a cockpit, an inflight entertainment display within an internal cabin, and/or the like. Moreover, the holding pattern analysis systems and methods allow air traffic controllers to concentrate on other duties, due to (for example) there being a reduced need for voice communication with a pilot regarding a holding pattern.

Certain embodiments of the present disclosure provide systems and methods of dynamically establishing holding patterns by utilizing flight tracking information, such as automatic dependent surveillance-broadcast (ADS-B) information, regarding air traffic proximate (such as within a predetermined range, such as 25 miles, 50 miles, 100 miles, or the like) to an airport. The systems and methods utilize real time position information of an aircraft, such as from an ADS-B tracking system. The systems and methods accurately predict aircraft arrival times as part of a coordinated air traffic management system for an airport.

The systems and methods are configured to detect a holding pattern of an aircraft. After a holding pattern is detected, the systems and methods predict how long the holding pattern will last.

During a flight, an aircraft is tracked through a flight tracking system (such as an ADS-B or radar system). The tracking data is compared with a flight plan of the aircraft. If the tracking data shows that the aircraft is diverting or has diverted from the flight plan, the system determines that the aircraft is in a holding pattern. After determining that the aircraft is in the holding pattern, a duration of the holding pattern is predicted, such as through historical data of holding patterns with respect to the destination airport, the number of other flights currently in a holding pattern, durations of holding patterns for other aircraft in relation to the destination airport, and/or the like.

FIG. 1 is a schematic representation of a holding pattern analysis system 100 in communication with an aircraft 102, according to an embodiment of the present disclosure. In at least one embodiment, the holding pattern analysis system 100 includes a tracking sub-system 104 that is configured to track a current position of the aircraft 102.

The holding pattern analysis system 100 includes a holding pattern detection unit 106 that is in communication with the tracking sub-system 104, such as through one or more wired or wireless connections. For example, the holding pattern detection unit 106 may wirelessly communicate with the tracking sub-system 104 through one or more transceivers, radio units, and/or the like. The holding pattern detection unit 106 is also in communication with a flight plan database 108 through one or more wired or wireless connections.

The holding pattern detection unit 106 is also in communication with a holding time prediction unit 110 through one or more wired or wireless connections. The holding time prediction unit 110 is also in communication with a historic holding pattern database 112, such as through one or more wired or wireless connections.

The tracking sub-system 104, the holding pattern detection unit 106, the flight plan database 108, the holding time prediction unit 110, and the historic holding pattern database 112 may be at a common location, such as at a central monitoring center. In at least one embodiment, the tracking sub-system 104, the holding pattern detection unit 106, the flight plan database 108, the holding time prediction unit 110, and the historic pattern database 112 may be part of a single, common computing system at a common location. Optionally, the tracking sub-system 104 may be remotely located from the other components of the holding patterns analysis system 100. Also, optionally, the holding pattern detection unit 106 and the holding time prediction unit 110 may be components of a single control or processing unit, and/or separate and distinct control and processing units. Further, the flight plan database 108 and the historic holding pattern database 112 may be distinct portions of a single memory, and/or separate and distinct memories, for example.

The aircraft 102 includes a main body or fuselage 114 that defines an internal cabin 116, which includes a cockpit and may also include a passenger seating area. A flight computer 118 within the internal cabin includes a display 120 and/or a speaker 122. A plurality of passenger displays 124 (such as inflight entertainment displays) may be positioned within the internal cabin 116, such as on the rear of passenger seat headrests.

The aircraft 102 may also include a position sensor 126, such as a global positioning system sensor, an automatic dependent surveillance-broadcast (ADS-B) sensor, and/or the like. The position sensor 126 outputs a signal indicative of one or more of the position, altitude, heading, acceleration, velocity, and/or the like of the aircraft 102. Alternatively, the aircraft 102 may not include the position sensor 126. The aircraft 102 also include a communication device 129, such as a transceiver, radio unit, and/or the like, that allows the aircraft 102 to wirelessly communicate with a similar communication device 130 of the tracking sub-system 104.

The tracking sub-system 104 is configured to track a current position of the aircraft 102. In at least one embodiment, the tracking sub-system 104 is an ADS-B tracking sub-system. In such an embodiment, the ADS-B tracking sub-system 104 determines a current position of the aircraft via satellite navigation through a positional signal of the aircraft 102 output by the position sensor 126. The position sensor 126 may be or include a transmitter that periodically outputs information about the aircraft 102, such as identification, current position, altitude, and velocity. The tracking sub-system 104 receives the transmitted position signal from the position sensor 126 to determine a current and real time position, heading, velocity, and the like of the aircraft 102. Alternatively, the tracking sub-system 104 may be a radar system or other such system that is configured to track the position of the aircraft.

As shown, the holding pattern analysis system 100 may be separate and distinct from the aircraft 102. For example, the holding pattern analysis system 100 may be located at a land-based monitoring center. In at least one other embodiment, the holding pattern analysis system 100 may be onboard the aircraft 102, another aircraft, watercraft, spacecraft (for example, a satellite), and/or the like.

In operation, the tracking sub-system 104 tracks the current position of the aircraft 102, such as through ADS-B signals and/or information. The holding pattern detection unit 106 is in communication with the tracking sub-system 104 and compares the current position of the aircraft 102 (as determined by the tracking sub-system 104) with a flight plan of the aircraft 102, as stored in the flight plan database 108. If the current position of the aircraft 102 is on or otherwise part of the stored flight plan of the aircraft 102, then the holding pattern detection unit 106 determines that the aircraft 102 is flying according to the flight plan, and that the aircraft 102 is not in a holding pattern. If, however, the holding pattern detection unit 106 compares the current position of the aircraft 102 with the flight plan (including any updates during a flight) and determines that the aircraft is not at a location on or otherwise part of the stored flight plan (that is, deviation from a predetermined threshold amount of the flight plan), then the holding pattern detection unit 106 determines that the aircraft 102 is in a holding pattern.

In response to the holding pattern detection unit 106 determining that the aircraft 102 is within a holding pattern, the holding time prediction unit 110 analyzes a historic holding pattern database 112 to predict a duration of the holding pattern. The historic holding pattern database 112 stores historic data regarding holding patterns for aircraft with respect to a particular destination airport. For example, the historic holding pattern database 112 may store holding pattern data for flights landing at the destination airport for the current day, week, month, year, or more.

Further, the holding time prediction unit 110 may be in communication with the tracking sub-system 104 to determine whether other flights are currently in a holding pattern in relation to the destination airport. Based on the number of flights currently in a holding pattern (and which may be in line to land before the aircraft 102), and the average duration of a holding pattern as determined through from the holding pattern data stored in the historic holding pattern database 112, the holding time prediction unit 110 then predicts a duration of the holding pattern of the aircraft 102. Alternatively, the holding time prediction unit 110 may predict a duration of the holding pattern based on the number of aircraft scheduled to land before the aircraft 102, and/or the number of aircraft proximate to the destination airport that are in holding patterns (without use of historical data of previous flights).

For example, the holding time prediction unit 110 may determine that a typical (such as an average or mean) holding time pattern for an aircraft with respect to the destination airport is ten minutes based on the holding pattern time data stored in the historic holding pattern database 112 in relation to a predetermined time period and/or predetermined similar weather conditions. As such, the holding time prediction unit 110 may then predict that the duration of the holding pattern of the aircraft 102 will be ten minutes from the time the aircraft 102 diverted from the flight plan (for example, entered the holding pattern), and then update a predicted landing time accordingly. The holding time prediction unit 110 may extend or shorten the predicted duration of the holding pattern based on the number of other flights scheduled to land before the aircraft 102 and/or those currently in holding patterns. For example, if there are no other flights currently in a holding pattern, the holding time prediction unit 110 may decrease the predicted duration of the holding pattern by a predetermined time (such as one or two minutes). Conversely, the holding time prediction unit 110 may extend the predicted duration of the holding time pattern by a predetermined time (such as one or two minutes) for each other aircraft within a holding pattern that is scheduled to land at the destination airport before the aircraft 102.

After the holding time prediction unit 110 determines the predicted duration of the holding pattern for the aircraft 102 and generates an associated holding time prediction, the holding pattern analysis system 100 (such as through the holding time prediction unit 110) may output a holding pattern prediction signal to the aircraft 102. The holding pattern prediction signal includes data indicative of the holding time prediction of the aircraft 102 as determined by the holding time prediction unit 110. The holding time prediction signal is received by the aircraft 102. The flight computer 118 may display the holding time prediction on the display 120 (such as via text, graphics, or video) to a pilot of the aircraft 102. Optionally, the flight computer 118 may broadcast the holding time prediction to the pilot through the speaker 122. Further, the holding time prediction may be output to the passenger displays 124 in order to keep passengers apprised of the duration of the holding pattern and/or a predicted time of landing.

In at least one embodiment, the holding time prediction unit 110 may be used to predict a total or remaining time of a holding pattern, such as if requested by a pilot. That is, the holding pattern analysis system 100 need not first determine that an aircraft is in a holding pattern in order to predict a total and/or remaining time of the holding pattern.

As shown in FIG. 1, the holding pattern analysis system 100 is configured to track a current position of the aircraft 102, determine whether the aircraft 102 is in a holding pattern, and then predict a total time for the holding pattern. While only one aircraft 102 is shown in FIG. 1, it is to be understood that the holding pattern analysis system 100 is configured to track current positions of multiple aircraft, determine whether the aircraft are in holding patterns, and predict total times of any holding patterns of the multiple aircraft.

As described, the holding pattern analysis system 100 determines a total time of a holding pattern for one or more aircraft. In one example, the holding pattern analysis system 100 updates a pilot (and optionally passengers) of the one or more aircraft regarding a holding pattern without the need for communication between the pilot and an air traffic controller. The holding pattern analysis system 100 is configured to inform pilots and passengers onboard an aircraft as to the duration of a holding pattern and when they can expect to land at a destination airport.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the holding pattern detection unit 106 and the holding time prediction unit 110 may be or include one or more processors that are configured to control operation of holding pattern analysis system 100, as described above. As indicated, the holding pattern detection unit 106 and the holding pattern analysis system 100 may be separate and distinct control units, or may be part of the same control unit.

The holding pattern detection unit 106 and the holding time prediction unit 110 are configured to execute a set of instructions that are stored in one or more data storage units or elements (such as one or more memories), in order to process data. For example, the holding pattern detection unit 106 and the holding time prediction unit 110 may include or be coupled to one or more memories. The data storage units may also store data or other information as desired or needed. The data storage units may be in the form of an information source or a physical memory element within a processing machine.

The set of instructions may include various commands that instruct the holding pattern detection unit 106 and the holding time prediction unit 110 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the holding pattern detection unit 106 and the holding time prediction unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the holding pattern detection unit 106 and the holding time prediction unit 110 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
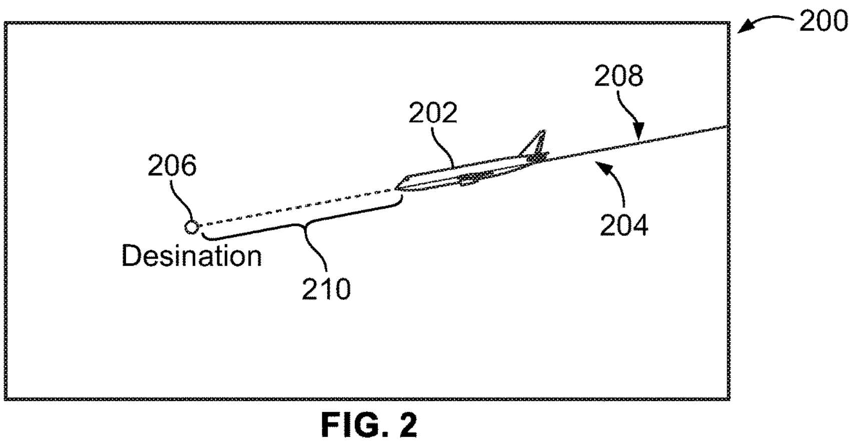
FIG. 2 is a diagrammatic representation of a front view of a display showing indicia of an aircraft flying according to a flight plan, according to an embodiment of the present disclosure.

FIG. 2 is a diagrammatic representation of a front view of a display 200 showing indicia 202 of the aircraft 102 (shown in FIG. 1) flying according to a flight plan 204, according to an embodiment of the present disclosure. The display 200 may be the display 120 of the flight computer 118 within a cockpit of the aircraft 102, as shown in FIG. 1. Additionally, or optionally, the display 200 may be a passenger display 124, as shown in FIG. 1. In at least one embodiment, the display 200 may be a separate and distinct display of the holding pattern analysis system 100.

The flight plan 204 is a flight path from a departure airport (not shown in FIG. 2) to a destination airport, as represented by the destination airport point 206. Referring to FIGS. 1 and 2, the flight plan 204 is stored in the flight plan database 108. The aircraft 102, as indicated by the indicia 202, has traveled a flown or completed portion 208 of the flight plan 204. The flight plan 204 also includes an incomplete or un-flown remaining portion 210 between the current position 202 of the aircraft 102 and the destination airport 206. Based on the current position 202 of the aircraft 102 within the flight plan 204, the holding pattern detection unit 106 determines that the aircraft 102 is flying according to the flight plan 204, and is not in a holding pattern. As such, the holding pattern detection unit 106 continues to monitor the current position of the aircraft 102 in relation to the stored flight plan 204.

Figure 3:
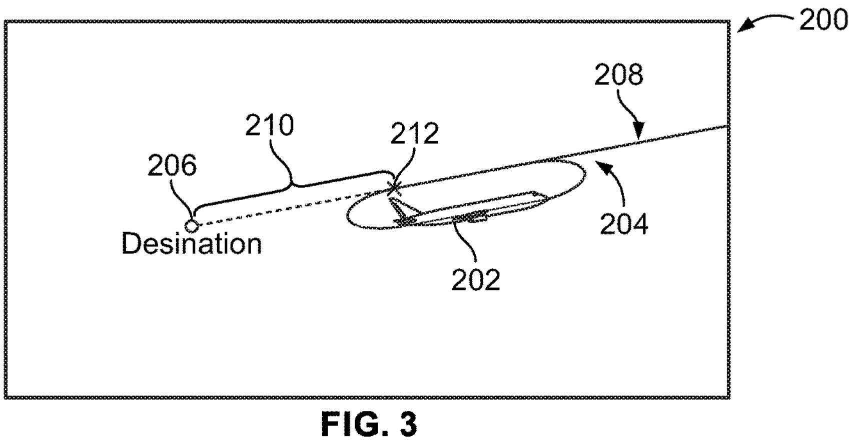
FIG. 3 is a diagrammatic representation of a front view of a display showing indicia of an aircraft diverted from a flight plan, according to an embodiment of the present disclosure.

FIG. 3 is a diagrammatic representation of a front view of the display 200 showing the indicia 202 of the aircraft 102 diverted from the flight plan 204, according to an embodiment of the present disclosure. Referring to FIGS. 1 and 3, the aircraft 102 diverts from the flight plan 208 at diversion indicia 212. The holding pattern detection unit 106 detects the diversion from the flight plan 208. In response to the holding pattern detection unit 106 detecting the diversion from the flight plan 208, as shown by the diversion indicia 212, the holding time prediction unit 110 determines and outputs a holding time prediction to the aircraft 102, as described above, thereby allowing the pilot and/or passengers to determine a predicted landing time of the aircraft 102 without the need for directly communicating with an air traffic controller. In at least one embodiment, the detection of the holding pattern and the prediction of the time of the holding pattern are also communicated to air traffic control.

Figure 4:
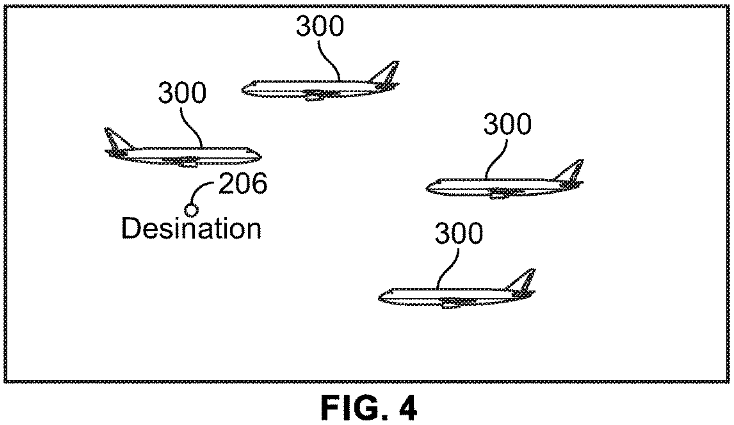
FIG. 4 is a diagrammatic representation of a front view of a display showing indicia of a plurality of aircraft proximate to a destination airport, according to an embodiment of the present disclosure.

FIG. 4 is a diagrammatic representation of a front view of the display 200 showing indicia 300 of a plurality of aircraft proximate to the destination airport 206, according to an embodiment of the present disclosure. The indicia 300 are not intended to represent the aircraft to scale. Referring to FIGS. 1 and 4, the holding pattern analysis system 100 is configured to track multiple aircraft, as shown by the indicia 300, and determine holding pattern time durations for each of the aircraft.

In at least one embodiment, the holding pattern detection unit 106 may be configured to detect a holding pattern for one or more aircraft that are proximate to the destination airport 206. For example, the holding pattern detection unit 106 may be configured to detect holding patterns for aircraft within a predefined range of the destination airport 206. The predefined range may be one hundred miles. Optionally, the predetermined range may be less than one hundred miles (such as fifty miles), or greater than one hundred miles (such as two hundred miles).

Figure 5:
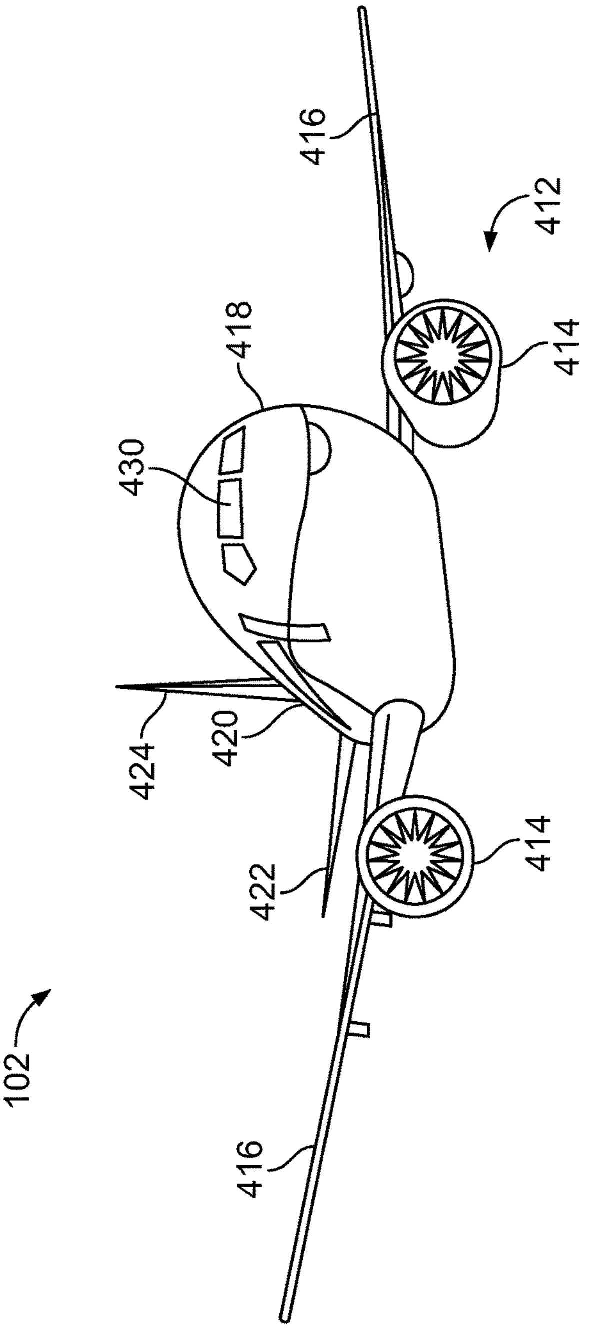
FIG. 5 is a diagrammatic representation of a front perspective view of an aircraft, according to an embodiment of the present disclosure.

FIG. 5 is a diagrammatic representation of a front perspective view of the aircraft 102, according to an embodiment of the present disclosure. The aircraft 102 includes a propulsion system 412 that may include two turbofan engines 414, for example. Optionally, the propulsion system 412 may include more engines 414 than shown. The engines 414 are carried by wings 416 of the aircraft 102. In other embodiments, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin, which may include a cockpit 430, one or more work sections (for example, galleys, personnel carry-on baggage areas, and the like), one or more passenger sections (for example, first class, business class, and coach sections), and an aft section in which an aft rest area assembly may be positioned.

Figure 6:
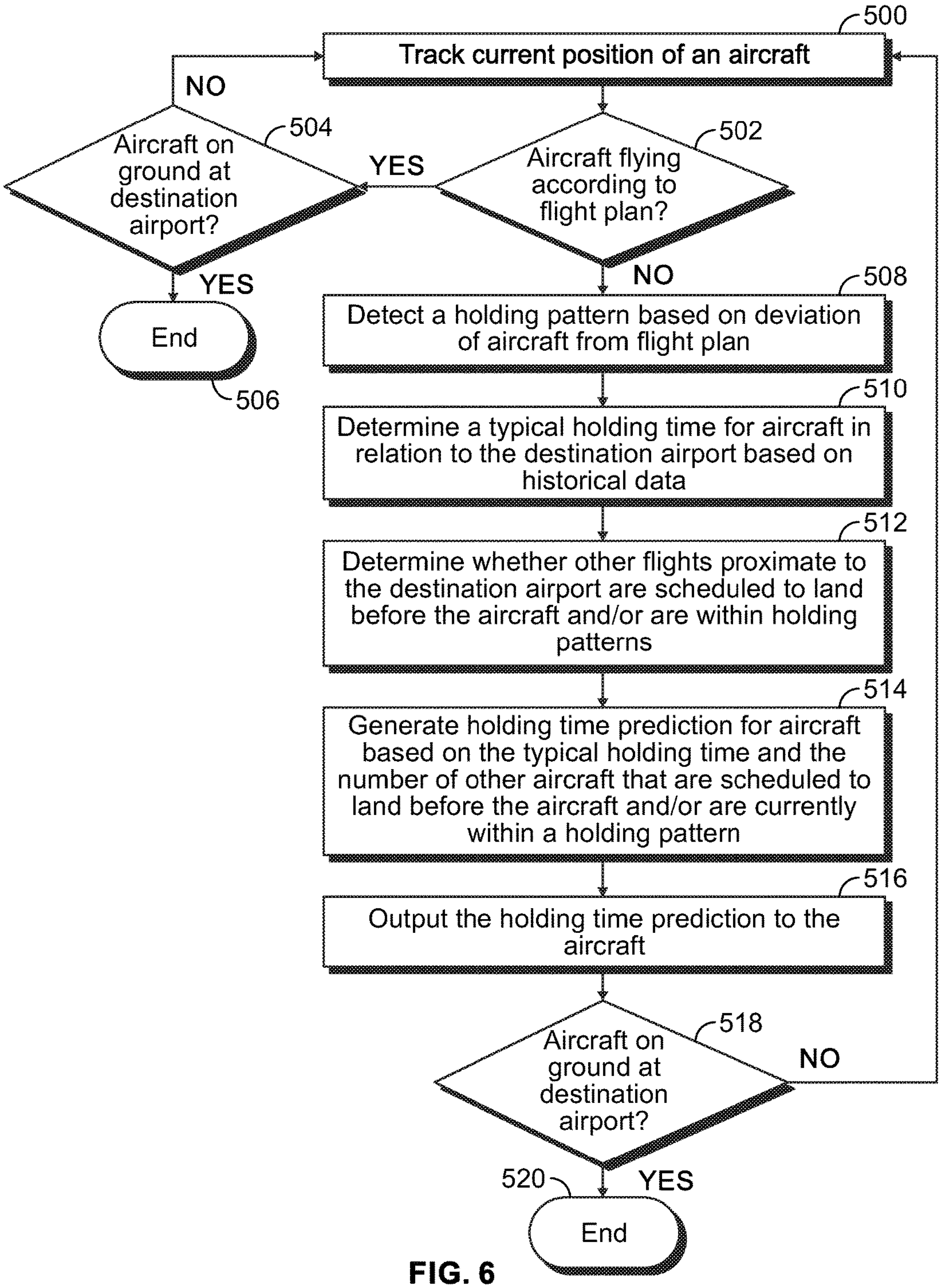
FIG. 6 illustrates a flow chart of a holding pattern analysis method, according to an embodiment of the present disclosure.

FIG. 6 illustrates a flow chart of a holding pattern analysis method, according to an embodiment of the present disclosure. Referring to FIGS. 1 and 6, the method begins at 500, at which the tracking sub-system 104 tracks a current position of the aircraft 102. The holding pattern detection unit 106 analyzes the current position of the aircraft 102, as tracked by the tracking sub-system 104, and compares the current position of the aircraft 102 to a flight plan of the aircraft 102 stored in the flight plan database 108.

At 502, the holding pattern detection unit 106 determines whether the aircraft 102 is flying according to the flight plan based on the comparison of the current position of the aircraft 102 and the stored flight plan. If the aircraft 102 is flying according to the flight plan, the method proceeds from 502 to 504, at which the tracking sub-system 104 or another monitoring system determines whether the aircraft 102 is on the ground at the destination airport. If the aircraft 102 is on the ground at the destination airport, the method ends at 506. If, however, the aircraft 102 is not on the ground at the destination airport, the method returns to 500 from 504.

If, at 502, the holding pattern detection unit 106 determines that the aircraft is not flying according to the flight plan, then the method proceeds from 502 to 508, at which the holding pattern detection unit 106 detects that the aircraft 102 is in a holding pattern based on a deviation of the aircraft 102 from the flight plan. Then at 510, the holding time prediction unit 110 determines a typical holding time for the aircraft 102 in relation to the destination airport based on historical data, as stored in the historic holding pattern database 112. The typical holding time may be an overall average holding time for all aircraft scheduled to land at the destination airport over a predetermined period of time (such as within the current day, week, month, year, decade, or entire lifetime of the airport). In at least one embodiment, the typical holding time may be determined as an average or mean holding time at a particular time of day, during weather conditions that are similar to current weather conditions, and/or the like. In at least one embodiment, the holding time prediction unit 110 may determine a typical holding time as a range of times from shortest to longest for all flights during over a predetermined period of time, a subset of flights over the predetermined of time (such as subset of flights at a particular time of day, or during particular weather conditions), and/or the like.

At 512, the holding time prediction unit 110 may also determine whether other flights proximate to the destination airport are scheduled to land before the aircraft 102, and/or are within holding patterns. At 514, the holding time prediction unit 110 may then generate a holding time prediction for the aircraft 102 based on the typical holding time and the number of other aircraft that are scheduled to land before the aircraft 102 and/or those that are currently within holding patterns. At 516, the holding time prediction unit 110 then outputs the holding time prediction to the aircraft 102.

At 518, the tracking sub-system 104 (or another monitoring system) determines whether the aircraft 102 is on the ground at the destination airport. If not, the method returns to 500. If, however, the aircraft 102 is on the ground at the destination airport, the method ends at 520.

Embodiments of the present disclosure provide systems and methods that allow large amounts of data to be quickly and efficiently analyzed by a computing device. For example, numerous aircraft may be proximate to a destination airport, each of which is scheduled to land. As such, large amounts of data are being tracked and analyzed. The vast amounts of data are efficiently organized and/or analyzed by the holding pattern analysis system 100, as described above. The holding pattern analysis system 100 analyzes the data in a relatively short time in order to quickly and efficiently output holding time predictions for the various aircraft within the vicinity of the destination airport. For example, the holding pattern analysis system 100 analyzes current flight data and outputs holding time predictions for the various aircraft in real time. A human being would be incapable of analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A holding pattern analysis system, comprising:

a holding pattern detection unit that is configured to detect when an aircraft is flying in a holding pattern proximate to a destination airport; and a holding time prediction unit that is configured to predict a total time of the holding pattern in response to the holding pattern detection unit detecting that the aircraft is flying in the holding pattern, wherein the holding time prediction unit is configured to communicate the total time of the holding pattern to one or both of a pilot of the aircraft or an air traffic controller.

2. The holding pattern analysis system of claim 1, further comprising a tracking sub-system in communication with the holding pattern detection unit, wherein the tracking sub-system is configured to track a current position of the aircraft, and wherein the holding pattern detection unit is configured to detect when the aircraft is flying in the holding pattern based on the current position of the aircraft.

3. The holding pattern analysis system of claim 2, wherein the tracking sub-system is an automatic dependent surveillance-broadcast (ADS-B) tracking sub-system.

4. The holding pattern analysis system of claim 1, further comprising a flight plan database coupled to the holding pattern detection unit, wherein the flight plan database stores flight plan data regarding a flight plan of the aircraft, and wherein the holding pattern detection unit is configured to detect when the aircraft is flying in the holding pattern based on a deviation of the aircraft from the flight plan.

5. The holding pattern analysis system of claim 1, wherein the holding time prediction unit is configured to predict the total time of the holding pattern based, at least in part, on a number of other aircraft scheduled to land at the destination airport before the aircraft.

6. The holding pattern analysis system of claim 1, wherein the holding time prediction unit is configured to predict the total time of the holding pattern based, at least in part, on a number of other aircraft flying in at least one other holding pattern proximate to the destination airport.

7. The holding pattern analysis system of claim 1, wherein the holding time prediction unit is configured to predict the total time of the holding pattern based, at least in part, on historical data of holding patterns of previous aircraft that landed at the destination airport.

8. The holding pattern analysis system of claim 7, wherein the historical data of holding patterns of other aircraft is based on a current day of flights.

9. The holding pattern analysis system of claim 7, wherein the historical data of holding patterns of other aircraft is based on at least one week of flights.

10. The holding pattern analysis system of claim 7, wherein the historical data of holding patterns of the other aircraft is based on at least one year of flights.

11. The holding pattern analysis system of claim 7, further comprising a historic holding pattern database coupled to the holding time prediction unit, wherein the historic holding pattern database stores the historical data of holding patterns of the other aircraft.

12. The holding pattern analysis system of claim 1, wherein the holding time prediction unit is configured to output a holding time prediction signal to the aircraft, wherein the holding time prediction signal includes a holding time prediction regarding the total time of the holding pattern, and wherein the holding time prediction is displayed on one or both of a display of a flight computer or a passenger display.

13. A holding pattern analysis method, comprising:

detecting, using a holding pattern detection unit, when an aircraft is flying in a holding pattern proximate to a destination airport;

predicting, using a holding time prediction unit, a total time of the holding pattern in response to the holding pattern detection unit detecting that the aircraft is flying in the holding pattern; and communicating the total time of the holding pattern to one or both of a pilot of the aircraft or an air traffic controller.

14. The holding pattern analysis method of claim 13, further comprising:

coupling a tracking sub-system to the holding pattern detection unit; and tracking, using the tracking sub-system, a current position of the aircraft, wherein the detecting is based on the current position of the aircraft.

15. The holding pattern analysis method of claim 13, further comprising:

coupling a flight plan database to the holding pattern detection unit; and storing flight plan data regarding a flight plan of the aircraft in the flight plan database, wherein the detecting is based on a deviation of the aircraft from the flight plan.

16. The holding pattern analysis method of claim 13, wherein predicting is based on one or more of a number of other aircraft scheduled to land at the destination airport before the aircraft, on a number of other aircraft flying in at least one other holding pattern proximate to the destination airport, and historical data of holding patterns of previous aircraft that landed at the destination airport.

17. The holding pattern analysis method of claim 16, wherein the historical data of holding patterns of other aircraft is based on one or more of a current day of flights, at least one week of flights, and at least one year of flights.

18. The holding pattern analysis method of claim 16, further comprising storing the historical data of holding patterns of the other aircraft within a historic holding pattern database coupled to the holding time prediction unit.

19. The holding pattern analysis method of claim 13, further comprising:

outputting a holding time prediction signal to the aircraft, wherein the holding time prediction signal includes a holding time prediction regarding the total time of the holding pattern; and displaying the holding time prediction on one or both of a display of a flight computer or a passenger display.

20. A holding pattern analysis system, comprising:

a holding pattern detection unit that is configured to detect when an aircraft is flying in a holding pattern proximate to a destination airport;

an automatic dependent surveillance-broadcast (ADS-B) tracking sub-system in communication with the holding pattern detection unit, wherein the ADS-B tracking sub-system is configured to track a current position of the aircraft, and wherein the holding pattern detection unit is configured to detect when the aircraft is flying in the holding pattern based on the current position of the aircraft;

a flight plan database coupled to the holding pattern detection unit, wherein the flight plan database stores flight plan data regarding a flight plan of the aircraft, and wherein the holding pattern detection unit is configured to detect when the aircraft is flying in the holding pattern based on a deviation of the aircraft from the flight plan;

a holding time prediction unit that is configured to predict a total time of the holding pattern in response to the holding pattern detection unit detecting that the aircraft is flying in the holding pattern, wherein the holding time prediction unit is configured to predict the total time of the holding pattern based on a number of other aircraft scheduled to land at the destination airport before the aircraft, a number of other aircraft flying in at least one other holding pattern proximate to the destination airport; and historical data of holding patterns of previous aircraft that landed at the destination airport, wherein the historical data of holding patterns of other aircraft is based on a current day of flights, and at least one year of flights; and a historic holding pattern database coupled to the holding time prediction unit, wherein the historic holding pattern database stores the historical data of holding patterns of the other aircraft, wherein the holding time prediction unit is configured to output a holding time prediction signal to the aircraft, wherein the holding time prediction signal includes a holding time prediction regarding the total time of the holding pattern, and wherein the holding time prediction is displayed on one or both of a display of a flight computer or a passenger display.

21. A holding pattern analysis system, comprising:

a holding time prediction unit that is configured to predict a total time of a holding pattern of an aircraft in response to detection of the aircraft flying in the holding pattern, wherein the holding time prediction unit is configured to communicate the total time of the holding pattern to one or both of a pilot of the aircraft or an air traffic controller.

* * * * *